US006557683B2

(12) United States Patent
Geremia et al.

(10) Patent No.: US 6,557,683 B2
(45) Date of Patent: May 6, 2003

(54) FACE CLUTCH COUPLING DEVICE

(75) Inventors: Giancarlo Geremia, S. Martino di Lupari (IT); Luciano Malvestio, Villanova di Camposampiero (IT); Lucio Pinturi, Campodarsego (IT)

(73) Assignee: Carraro S.p.A., Padua (IT)

( * ) Notice: Subject to any disclaimer, the term of this patent is extended or adjusted under 35 U.S.C. 154(b) by 0 days.

(21) Appl. No.: 09/767,752

(22) Filed: Jan. 24, 2001

(65) Prior Publication Data
US 2001/0023806 A1 Sep. 27, 2001

(51) Int. Cl.[7] ............................................. F16D 23/14
(52) U.S. Cl. ........................... 192/53.5; 192/69.7
(58) Field of Search ............................ 192/53.5, 69.7, 192/69.71, 69.82, 91 A

(56) References Cited
U.S. PATENT DOCUMENTS 649,704 A * 5/1900 McGloughlin et al. .... 192/53.5
1,859,351 A * 5/1932 Zancan ..................... 192/53.5
5,794,752 A * 8/1998 Baer et al. .................. 192/86
6,253,882 B1 * 8/2001 White ......................... 192/86

FOREIGN PATENT DOCUMENTS

IT          189971          6/1982

* cited by examiner

Primary Examiner—Matthew C Graham
(74) Attorney, Agent, or Firm—Sughrue Mion, PLLC

(57) ABSTRACT

A face clutch coupling device between rotating members comprises a first clutch element and a second clutch element which have face teeth and are movable relative to one another between a disengagement position and an engagement position in which the rotating members are coupled for rotation with one another. The device also comprises braking members which are associated with the clutch elements and by virtue of which, when there is relative motion between the rotating members, a preliminary driving interaction of the rotating members is brought about in the engagement position.

9 Claims, 1 Drawing Sheet

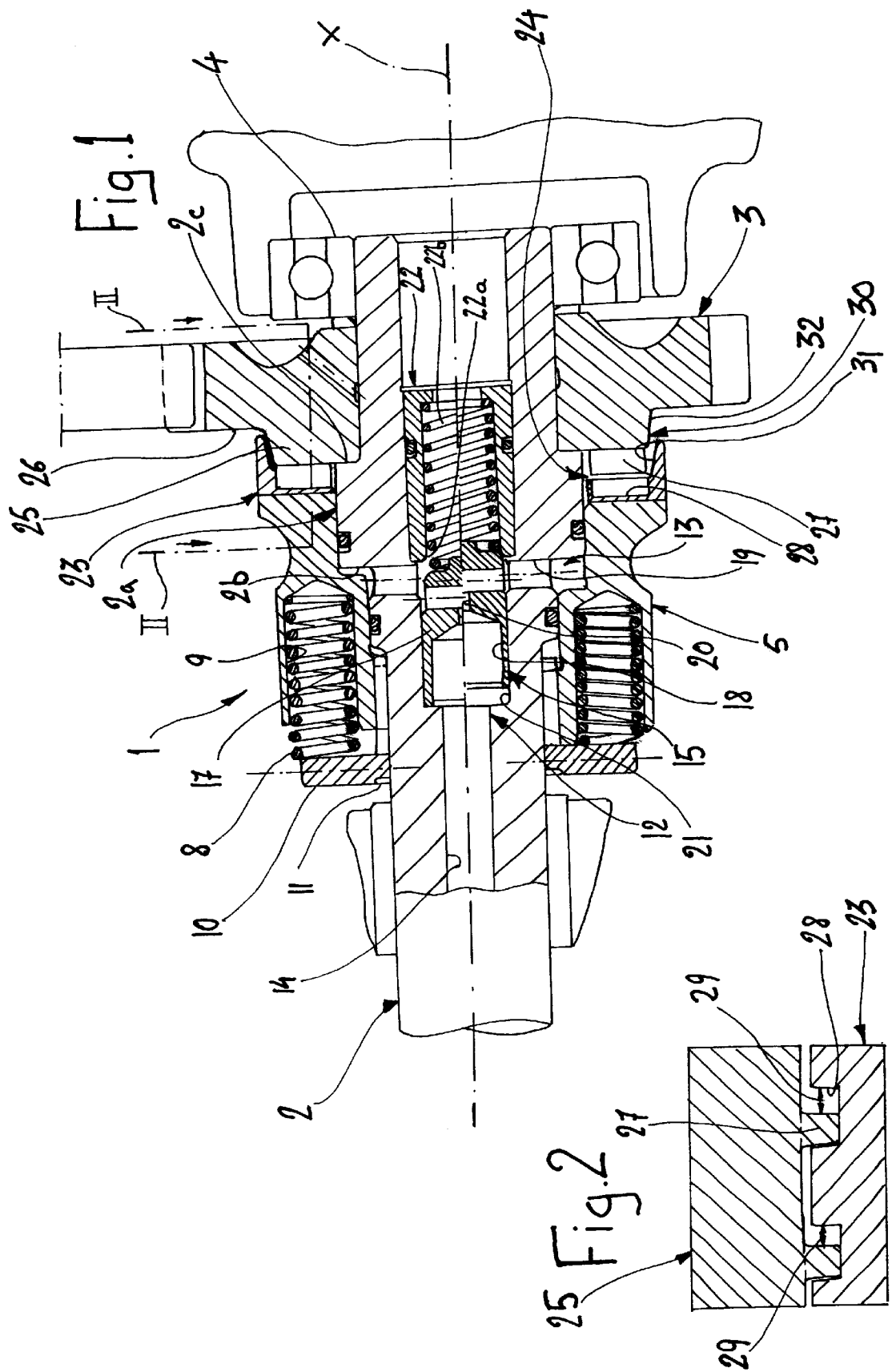

FACE CLUTCH COUPLING DEVICE

DESCRIPTION

The present invention relates to a face clutch coupling device according to the preamble to the main claim.

Within the technical field relating to mechanisms for transmitting drive between rotating members, clutch coupling devices are known, by means of which it is possible to connect such members for rotation together (the "engaged" condition) or, alternatively to disconnect them, interrupting the transmission of the drive (the disengaged condition).

In this specific field, face clutch coupling devices have been defined, which enable the above-mentioned engaged condition also to be reached starting from a situation of relative motion between the rotating members concerned. An example of devices of this type is described in Italian utility model patent No. 189971. However, the insertion of coupling devices of the type mentioned in a drive-transmission line, for example, in a tractor, leads to undesired noise when the direction of rotation of members already meshed with one another is reversed.

This noise can most generally be attributed to the inevitable presence of circumferential play between teeth and corresponding recesses in the gears making up any transmission line, but the disadvantage is considerably magnified when the transmission line includes a face coupling device of the above-mentioned type which requires relatively large circumferential play for its operation.

The problem upon which the present invention is based is that of providing a face clutch coupling device which is designed structurally and functionally to overcome the limitations set out above with reference to the prior art cited.

This problem is solved by the present invention by means of a coupling device formed in accordance with the appended claims.

The characteristics and the advantages of the invention will become clear from the detailed description of a preferred embodiment thereof, described by way of non-limiting example with reference to the appended drawing, in which:

FIG. 1 is a partially-sectioned view of a face clutch coupling device formed in accordance with the present invention, shown symmetrically in two different operative positions, and FIG. 2 is a section taken in the plane II—II of a detail of the coupling device of FIG. 1.

With reference to the appended drawings, a face clutch coupling device formed in accordance with the present invention is generally indicated 1. The device 1 comprises a first rotating member and a second rotating member which are constituted, respectively, by a shaft 2 of axis X and by a gear 3 mounted so as to be freely rotatable on the shaft 2.

A portion 2a of enlarged cross-section identified on the shaft defines two opposed shoulders 2b, 2c, and the gear 3 is positioned on the shaft 2 between the shoulder 2c and a bearing 4 supporting the shaft 2.

A sleeve 5 is mounted coaxially on the shaft 2 by means of a splined coupling. The sleeve 5 is thus kept fixed for rotation with the shaft 2 and, at the same time, can slide axially between an operative (engagement) position against the shoulder 2b and an inoperative (disengagement) position, in which it is removed therefrom.

Both of these positions are shown in FIG. 1, in the upper half and in the lower half thereof, respectively.

The sleeve 5 is urged resiliently towards the operative position by springs 8 housed in seats 9 in the sleeve 5 and reacting against a stop ring 10 in abutment on the shaft 2 and positioned against a spring ring 11.

Actuator means, generally indicated 12, provided for moving the sleeve 5 axially to the inoperative position against the action of the springs 8, comprise a hydraulic jack system including a chamber 13 which is defined between the shaft 2 and the sleeve 5 and can be put into communication with a supply duct 14 by means of a valve 15.

The valve 15, as well as the supply duct 14, are formed in the shaft 2 and the valve 15 comprises a closure member 17 in which there is a passageway 18 between the supply duct 14 and a radial duct 19 for selectively putting the duct 14 into communication with the chamber 13. There is a constriction 20 in the passageway 18. The closure member 17 is housed in a seat 21 and is movable axially away from and towards an operative position, shown in the lower portion of FIG. 1, in which the supply duct 14 is in communication with the radial duct 19.

In this operative position, the closure member 17 is arranged in abutment with an abutment seat 22a of a tubular element 22, in opposition to a spring 22b housed therein. The tubular element 22 is coaxial with the closure member 17 and is open to the exhaust.

On the sleeve 5, on the side facing the gear 3, there is a first clutch element 23 of a coupling with face teeth 24, the second and corresponding clutch element 25 of which is formed on a side 26 of the gear 3. These clutch elements 23 and 25 are typically formed by teeth 27 and respective recesses 28, each tooth being capable of being housed in the corresponding recess with circumferential play indicated 29. The play 29 is quite large so that the first and second clutch elements 23 and 25 can mesh with one another even when there is relative motion between the shaft 2 and the gear 3.

Braking means 30 associated with the coupling 24 include a first, conical friction surface 31 extending annularly around the recesses of the first clutch element 24 and coaxial with the shaft 2. On the gear 3, the braking means correspondingly comprise a second friction surface 32 which is formed annularly around the teeth of the second clutch element 25, is also conical and coaxial with the shaft 2, and can engage the first friction surface 31 with friction when the sleeve 5 is moved to the operative engagement position.

When there is relative motion between the shaft 2 and the gear 3, and when the sleeve 5 is moved to the operative position, the braking means 30 serve to bring about a preliminary driving interaction between the rotating members.

The taper of the friction surfaces 31 and 32 serves for facilitating their mutual contact when the sleeve is moved to the engagement position and also for advantageously making use of the resilient force of the springs 8.

In an initial, inoperative condition, shown in the lower portion of FIG. 1, the sleeve 5 is moved to the disengagement position and rotates, together with the shaft 2, about the axis X, whilst the gear 3 is stationary relative to the sleeve 5 and the shaft 2. In this condition, the friction surfaces 31 and 32 are separated and the closure member 17 of the valve 15 is held in the operative position against the abutment seat 22a in opposition to the spring 22b by the pressure exerted by a working fluid supplied through the duct 14.

In order to engage the coupling device 1, the actuator means 12 are operated by depressurization of the supply duct 14. The closure member 17 is thus moved away from the abutment seat 22a by the action of the spring 22b, thus allowing the working fluid present in the chamber 13 to be discharged rapidly through the tubular element 22. The sleeve 5, which is no longer held in the disengagement position, is urged towards the gear 3 by the action of the springs 8.

It should be noted that, by virtue of the rapid depressurization of the chamber 13 permitted by the valve 15, the face coupling 24 can advantageously be dimensioned with less play 29 between the teeth 27 and the recesses 28 than the face clutch couplings considered above with reference to the prior art.

In the engagement condition, shown in the upper portion of FIG. 1, the teeth 27 of the second clutch element 25 are engaged in the corresponding recesses 28 of the first clutch element 23 and the friction surfaces 31 and 32 are in mutual contact.

If there is relative rotary motion between the first and second clutch elements, a driving interaction is thus brought about between the shaft 2 and the gear 3, allowing the gear to take up at least partially any circumferential play present in any gearings disposed downstream in the drive transmission line.

This avoids abrupt and instantaneous taking-up of the above-mentioned play when the teeth 27 of the second element 25 abut the recesses 28 of the first clutch element 23, and consequently reduces the noise of the engagement operation.

The action of the braking means 30 is advantageously also utilized in exactly the same way when the direction of rotation of the shaft 2 is reversed whilst the sleeve 5 is in the engagement position. In this case, in addition to the at least partial taking-up of the circumferential play in the drive transmission line, the noise is also limited by the fact that the speed of impact between the teeth 27 and the recesses 28 is reduced by the action of the braking means 30.

In order to disengage the coupling device 1, the actuator means 12 are operated by pressurization of the working fluid in the supply duct 14. As a result of the pressure exerted on the closure member 17, it is moved axially to the operative position, in opposition to the spring 22b, thus putting the duct 14 into communication with the chamber 13 and at the same time preventing the working fluid from reaching the interior of the tubular body 22.

The pressure of the fluid in the chamber 13 is such as to bring about the axial movement of the sleeve 5 to the disengagement position and its retention in that position, against the action of the springs 8.

The present invention thus solves the problem complained of with reference to the prior art cited, at the same time offering many advantages, amongst which is a considerable reduction in the noise of the transmission when the direction of rotation is reversed.

What is claimed is:

1. A face clutch coupling device comprising a first rotating member and a second rotating member, as well as a first clutch element and a second clutch element which have face teeth and are associated with the first rotating member and with the second rotating member, respectively, the clutch elements being movable relative to one another between a disengagement position and an engagement position in which the rotating members are coupled for rotation with one another, and braking means associated with the clutch elements so that, when there is relative motion between the rotating members, the braking means bring about a preliminary driving interaction between the rotating members and the braking means remain in engagement when the clutch elements are in the engagement position.

2. A device according to claim 1 in which resilient means are provided and act between the clutch elements in order to urge them resiliently into the engagement position.

3. A device according to claim 1 in which the braking means comprise respective friction surfaces defined on both of the clutch elements, the surfaces being able to contact one another in the engagement position so as to produce a mechanical friction driving interaction between the rotating members.

4. A device according to claim 3 in which the friction surfaces extend annularly around the clutch elements and are coaxial with the rotating members.

5. A device according to claim 3 in which the friction surfaces are conical.

6. A device according to claim 1, in which the first clutch element is fixed for rotation with the first rotating member and is translatable axially relative thereto in order to mesh with the second clutch element.

7. A device according to claim 6 in which the first clutch element is translatable relative to the first rotating member, in opposition to the resilient means, by means of a hydraulic jack system.

8. A device according to claim 7 in which the hydraulic jack system comprises a chamber which is defined between the first clutch element and the first rotating member and which can be expanded by a working fluid in order to translate the first clutch element relative to the first rotating member, means for the rapid discharge of the working fluid from the chamber, and shut-off means for selectively putting the chamber into communication with the rapid discharge means.

9. A device according to claim 8 in which the shut-off means comprise a closure member in which there is a passageway which can put the chamber into communication with a duct for the supply of the fluid when the rapid-discharge means are shut off by the closure member.

* * * * *